United States Patent Office 3,259,754
Patented July 5, 1966

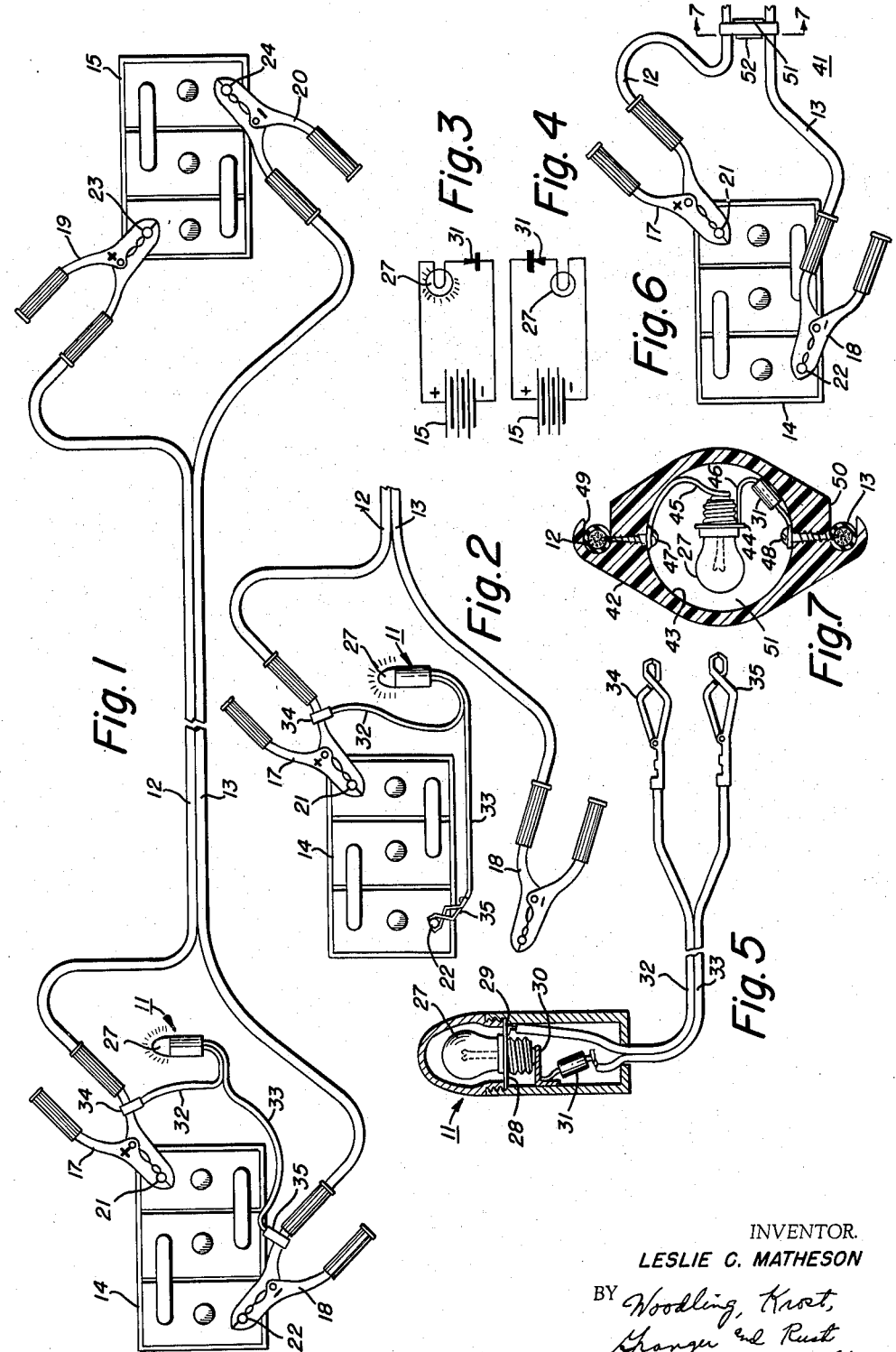

3,259,754
POLARITY INDICATOR
Leslie C. Matheson, 24023 Mapleridge Drive,
North Olmsted, Ohio
Filed Oct. 23, 1962, Ser. No. 232,458
2 Claims. (Cl. 307—85)

The invention relates in general to polarity indicators and more particularly to an electrical polarity indicator for use with battery conductors.

Storage battery jumper cables have become more common in recent years with the advent of automatic transmissions in automobiles. Previously with manual transmissions being the rule, if an automobile had a discharged battery the automobile could be pushed or towed in gear to turn over the engine and start the engine. With automatic transmissions, this is no longer feasible because of the poor torque characteristic thereof from the wheels to the engine of such an automatic transmission. Accordingly, jumper cables have become prevalent to connect the discharged battery to a charged battery with the two batteries in parallel to permit starting the stalled automobile from the other or charged storage battery.

In many cases this jumper connection or parallel connection of the two batteries must be made in darkness and in cold weather, and in such cases the automobile operator may be heavily clothed against the elements. The darkness and the bulky clothing lead to difficulty in not only locating proper polarity of the battery terminals, for proper connection, but even in locating the batteries themselves. If the proper polarity connection of the two batteries is not observed, then the two batteries instead of being connected in parallel will be connected in a series loop circuit which will in effect be short-circuiting both batteries through each other, doing harm to both batteries instead of providing a charging connection between the batteries. Accordingly, it is extremely important that proper polarity connection be made between the two batteries to avoid discharging the one good battery. Discharge of the one good battery could easily mean that there would be two stalled automobiles instead of only one.

Accordingly, an object of the invention is to provide a means for determining the proper polarity of interconnection of two batteries.

Another object of the invention is to provide a combined trouble lamp and battery cable connectors to permit illumination from the trouble lamp to help determine the proper polarity connection to each battery.

Another object of the invention is to provide a method of determining the polarity of two different voltage sources and to determine the proper polarity interconnections between the two voltage sources.

Another object of the invention is to provide battery jumper cables with an indicator lamp which is illuminated only upon proper polarity connection to a voltage source.

Another object of the invention is to provide an indicator load which may be used with conductors connectable between voltage sources to provide an indication of proper polarity of the conductors relative to each source.

Other objects and a fuller understanding of this invention may be had by referring to the following description and claims, taken in conjunction with the accompanying drawings, in which:

FIGURE 1 is a plan view of the conductors and indicator lamp constructed in accordance with the invention as connected to two batteries;

FIGURE 2 is a partial view of one of the batteries of FIGURE 1 and showing an alternative connection;

FIGURE 3 is a schematic diagram of the proper polarity connection of the indicator to a battery;

FIGURE 4 is a schematic diagram of the improper polarity connection of the indicator to a battery;

FIGURE 5 is a sectional view through the indicator lamp;

FIGURE 6 is a partial plan view of one of the batteries with a modified form of polarity indicator; and FIGURE 7 is an enlarged sectional view on line 7—7 of FIGURE 6.

The figures of the drawings show a preferred embodiment of the polarity indicator 11 of the invention. This polarity indicator 11 may be used to indicate the proper polarity connection of first and second conductors 12 and 13 relative to terminals of batteries 14 and 15. The first and second conductors 12 and 13 may be heavy cables capable of carrying heavy currents without appreciable voltage drop. A first end of the conductors 12 and 13 includes spring jaw clamp connectors 17 and 18 with the first clamp 17 connected to the first conductor 12 and the second clamp 18 connected to the second conductor 13. The second end of the conductors 12 and 13 are provided with first and second spring jaw clamp connectors 19 and 20, respectively. The first battery 14 is shown as a six volt battery merely for purposes of illustration and has positive and negative terminals 21 and 22, respectively. The second battery 15 also has been shown as a six volt battery but need not be the same voltage as the first battery, and also has positive and negative terminals 23 and 24 respectively. Each of these batteries may be mounted in an automotive vehicle for example and in such case would have battery cables and clamps, not shown, for connection to the electrical system of such vehicles.

The polarity indicator 11 more particularly includes an incandescent filament lamp 27 mounted in a socket 28. The socket has two terminals 29 and 30 and a diode rectifier 31 is connected in series with the terminal 30. A first lead 32 is connected to the terminal 29 and a second lead 33 is connected to the other end of the rectifier 31. The outer ends of the leads 32 and 33 carry small spring clips 34 and 35 respectively. The rectifier 31 is so poled that the clip 34 is positive relative to the clip 35.

FIGURE 3 shows schematically the connection of the polarity indicator 11 to a battery such as battery 15. If the proper polarity connection is observed, current will flow from the positive terminal of the battery 15 through the lamp 27 and the rectifier 31 to illuminate the lamp 27. This is as shown in FIGURE 3. The electrons flow in the opposite direction, of course. However, if the connection of the series combination of lamp 27 and rectifier 31 is not of the correct polarity, then the lamp 27 will not be illuminated. This is as shown in FIGURE 4.

Operation

The polarity indicator 11 of the invention may be used as shown in FIGURE 1. In this case, the positive small spring clip 34 is connected to the first conductor 12 as by connecting on to the positive or first clamp 17. The second small clip 35 may be connected to the second conductor 13, as by connecting to the second clamp 18. Let us assume that the first battery 14 is the fully charged battery and the second battery 15 is the discharged battery which is to be charged. This is only for purposes of illustration and the opposite condition may prevail. The clamps 19 and 20 may first be connected to the terminals of the battery 15. If the polarity of the clamps 19 and 20 is correct, with respect to the polarity of the terminals 23 and 24, then the lamp 27 will be illuminated. If the polarity of connection is incorrect, then the lamp 27 will not be illuminated and hence this is an indication of improper polarity connection to this battery 15. Accordingly, the operator would reverse the connections of the clamps to the battery terminals to thus have the proper polarity connection to this battery 15 as shown in FIGURE 1.

This then illuminates the indicator lamp 27 which may then be used as a form of trouble lamp to make certain that a good physical and electrical connection has been made between the clamps 19 and 20 and the battery terminals. Also this aids in determining that the clamps are not close to touching some grounded surface in the automotive vehicle in which the battery 15 is located which might cause a short-circuit upon minor movement of the clamps. The above may be done with the other end of the cables carried over one's arm for example, so that the trouble lamp is available for illumination of the battery 15.

Next the trouble lamp and cable clamps 17 and 18 may be moved over to the battery 14 which for purposes of illustration may be in a second automotive vehicle. The battery 14 may be used to supply the battery power to start the vehicle in which battery 15 is located. The illumination of the trouble lamp 27 will help locate the battery 14 and locate the terminals thereon. It is common practice to mark a plus sign on the positive battery terminal and possibly this can be observed if the terminals are not badly corroded. Also it is common practice to make the positive terminal of slightly larger diameter than the negative terminal and the illuminated trouble lamp will help one observe this condition. Next, one of the cable clamps such as clamp 17 may be connected to a terminal of battery 14 which the operator hopes is the positive terminal. Then the operator may go back to the battery 15 and remove one of the cable clamps 19 or 20. This is a safety precaution to prevent short-circuiting the two batteries 14 and 15. The lamp 27 will now be extinguished, however, the operator will previously have located the position of the terminal 22 and will be better enabled to connect or at least touch the remaining clamp 18 to this remaining terminal. Since one of the clamps 19 or 20 has been disconnected, this touching of the remaining clamp 18 to the remaining terminal 22 cannot establish a short-circuit of the batteries. Further, if the polarity connection to the battery 14 is correct, the lamp 27 will again be illuminated. However, if the polarity connection is incorrect, the lamp 27 will remain extinguished. If the lamp is extinguished, then this shows the polarity should be reversed and the operator can reverse the clamps 17 and 18 on the terminals of the battery 14. If desired, the previously removed one of the clamps 19 or 20 may be reconnected to illuminate the lamp 27 to facilitate this connection, since the proper polarity will by then be determined. Upon proper polarity connection to both batteries, the lamp 27 will be illuminated. Thus, this polarity indicator 11 will have served its function and provided not only indication of polarity, but illumination to facilitate this proper connection.

FIGURE 2 shows an alternative manner of determining polarity. The operator may again make the initial connection to the battery 15 with the clamps 19 and 20 and reversing this connection if necessary in order to obtain illumination of the lamp 27. As before, this assures proper polarity of the clamps 19 and 20 relative to the battery 15. Next, the operator need not remove one of the clamps 19 and 20 in order to prevent short-circuiting, instead both clamps 19 and 20 are left connected to the battery 15 and the operator moves to the other battery 14. Here one of the clamps such as clamp 17 is connected to a battery terminal which the operator hopes is the proper one, in this illustration the positive terminal 21. The lamp 27 is illuminated during this operation to help locate the battery terminals and the polarity thereof. Next the operator may take the clip 35 and remove it from the clamp 18. At this instant, the lamp 27 will be extinguished but the operator may then touch the clip 35 to the remaining battery terminal 22. If the connection to the battery 14 is of the proper polarity, the lamp 27 will again be illuminated. If the polarity is not correct, the lamp 27 will not be illuminated to apprise the operator of this improper polarity. The clamps 17 and 18 may then be reversed in their connection to the battery terminals for proper connection to the battery 14.

FIGURES 6 and 7 show an alternative construction of a polarity indicator 41 which may be substituted for the polarity indicator 11. This polarity indicator 41, as best shown in FIGURE 7, includes an insulating base 42 having an aperture 43 extending from one face to the other. A socket 44 may be mounted in the aperture in any suitable manner as by the connecting wires 45 and 46. This socket 44 carries the lamp 27. The rectifier 31 is connected in the wire 46. The connecting wires 45 and 46 are fixed to the base 42 by the terminal screws 47 and 48, respectively, which extend through the base and pierce the insulation of the cable conductors 12 and 13, respectively. These cable conductors may be inserted in slots 49 and 50, respectively, in external ears of the base 42. Thus, the polarity indicator 41 may be sold as an item separate from the jumper cables 12 and 13 and may be fastened thereon by the consumer. The polarity indicator 41 may have a rear cover 51 and a front lens 52 to cover the aperture 43.

The polarity indicator 41 may be fixed to the cables 12 and 13 as shown in FIGURE 6. This may be about one foot from the cable clamps 17 and 18 and this has the advantage of retaining together the cable clamps 17 and 18 so they are more easily handled. The maximum spread between the jaws of the clamps 17 and 18 will then be about three feet which is adequate for all automotive storage batteries. The fact that the polarity indicator 41 provides a rigid connection between the two cables 12 and 13 near one end thereof, helps the operator manipulate these cables. When the cable clamps 19 and 20 are fastened on the battery 15, then of course the cable clamps 17 and 18 must not be inadvertently touched or there will be a short circuit of the battery 15. With the polarity indicator 41 in place, the operator may hold one of the cable clamps such as clamp 18 and the other clamp 17 will hang down about two or three feet below where it will be safe from coming in contact with the hand held clamp 18.

The polarity indicator 41, as shown in FIGURE 6, may be used to determine the polarity, as shown in the complete circuit of FIGURE 1. The polarity indicator 41 may be applied to the battery cables 12 and 13 at the time of manufacture and in such case, the slots 49 and 50 may be replaced merely by holes through which the insulated cables extend. The construction shown, however, permits the consumer to apply the polarity indicator to some previously purchased pair of jumper cables.

The lamp 27 and rectifier 31 provide an indicator load which provides an indication of the proper or improper polarity, by illumination or non-illumination. The entire polarity indicator 11 is simple and inexpensive to manufacture and operate and eliminates much fumbling around in the dark and also eliminates the possibility of discharging the one good battery of a pair of batteries.

The polarity indicator provides a handy and compact method for quickly and easily determining the proper polarity of two voltage sources intended to be connected in parallel which may be used by relatively unskilled operators not well versed in electrical principles.

The voltage of each battery has been indicated as being six volts. Twelve volts is a more common voltage at present in the United States although both are in use. A charged six volt battery may provide charging current to another six volt battery or a twelve volt battery is often used to supply charging current to the discharged battery, either six or twelve volts. Accordingly, a twelve volt filamentary lamp is satisfactory since it will be illuminated to full brilliance on twelve volts and will also be illuminated to about half brilliance on six volts. Even a discharged battery will usually have enough voltage to illuminate the lamp 27 even though it does not have enough of a charge condition to crank the engine.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a method for connecting together in proper polarity first and second sources of current by first and second conductors each having two ends with first and second clips, and a rectifier and electric lamp serially connected across said conductors, said method comprising attaching first and second clips of the first ends of the conductors to the first current source to determine proper polarity of the conductors relative to said first source by illumination of said lamp, disconnecting at least one of the clips on the first end of said conductors, and determining the polarity of said conductors relative to said second source by connecting said first and second clips of the second ends of the conductors attached to said second source with at least one of the clips on the first end disconnected from the first source.

2. In a method for connecting together in proper polarity first and second sources of current by first and second conductors each having two ends with first and second clips, and a rectifier and electric lamp serially connectable across said conductors by readily removable connectors, said method comprising attaching first and second clips of the first ends of the conductors to the first current source to determine proper polarity of the conductors relative to said first source by illumination of said lamp, connecting one of the clips on the second end of one of the conductors to the second current source, disconnecting the readily removable connector from the other of the conductors, and determining the polarity of said conductors relative to said second source by connecting said previously removed connector to said second source to observe the condition of illumination of said lamp and upon illumination of the lamp to connect the other of the clips on the second end of the conductors to the second current source.

References Cited by the Examiner

UNITED STATES PATENTS

| | | | |
|---|---|---|---|
| 1,610,205 | 12/1926 | Fritts | 320—48 |
| 2,286,101 | 6/1942 | Norberg | 136—181 X |
| 2,632,785 | 3/1953 | Knopp et al. | 324—133 |
| 2,632,793 | 3/1953 | Linn | 324—29.5 |
| 2,928,024 | 3/1960 | Dawley | 315—207 X |
| 2,956,229 | 10/1960 | Henel | 315—135 X |
| 3,051,887 | 8/1962 | Lind | 320—48 |
| 3,062,998 | 11/1962 | Medlar | 320—33 |
| 3,085,187 | 4/1963 | Godshalk | 320—25 |

ORIS L. RADER, *Primary Examiner.*

L. R. CASSETT, T. J. MADDEN, *Assistant Examiners.*